United States Patent
Nakagawa et al.

(10) Patent No.: US 11,170,511 B2
(45) Date of Patent: Nov. 9, 2021

(54) IMAGE PROCESSING DEVICE, IMAGING DEVICE, AND IMAGE PROCESSING METHOD FOR REPLACING SELECTED IMAGE AREA BASED ON DISTANCE

(71) Applicant: SONY SEMICONDUCTOR SOLUTIONS CORPORATION, Kanagawa (JP)

(72) Inventors: Takaaki Nakagawa, Kanagawa (JP); Keita Ishikawa, Kanagawa (JP); Hiromasa Doi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 140 days.

(21) Appl. No.: 16/496,795

(22) PCT Filed: Mar. 16, 2018

(86) PCT No.: PCT/JP2018/010396
§ 371 (c)(1),
(2) Date: Sep. 23, 2019

(87) PCT Pub. No.: WO2018/180578
PCT Pub. Date: Oct. 4, 2018

(65) Prior Publication Data
US 2020/0380697 A1    Dec. 3, 2020

(30) Foreign Application Priority Data
Mar. 31, 2017    (JP) .............................. JP2017-069804

(51) Int. Cl.
*G06T 5/00*    (2006.01)
*G06T 7/11*    (2017.01)
*G06T 7/194*    (2017.01)

(52) U.S. Cl.
CPC .............. *G06T 7/194* (2017.01); *G06T 5/002* (2013.01); *G06T 5/005* (2013.01); *G06T 7/11* (2017.01)

(58) Field of Classification Search
CPC ........... G03B 15/00; G06T 5/002; G06T 7/11; G06T 7/194; G06T 5/005; G06T 2207/20104; H04N 5/232
See application file for complete search history.

(56) References Cited

U.S. PATENT DOCUMENTS 5,784,498 A * 7/1998 Venable ................ G06T 11/001
358/448
6,661,918 B1 * 12/2003 Gordon .................... G06K 9/38
382/164

(Continued)

FOREIGN PATENT DOCUMENTS

CN          102812490 A      12/2012
JP         2004-304261 A     10/2004

(Continued)

OTHER PUBLICATIONS

International Search Report and Written Opinion of PCT Application No. PCT/JP2018/010396, dated May 15, 2018, 09 pages of ISRWO.

*Primary Examiner* — Yubin Hung
(74) *Attorney, Agent, or Firm* — Chip Law Group

(57) ABSTRACT

The present disclosure relates to an image processing device, an imaging device, and an image processing method to superimpose a complementary image in such a manner that an appearance becomes more natural. From an image acquired by imaging of an arbitrary subject, a removal region selecting unit selects a region, in which an intended object to be removed is included, as a removal region with reference to distance information that is acquired when the image is imaged and that indicates a distance to the subject.

(Continued)

Based on the distance information, a complementary region specifying unit specifies a complementary region to complement the removal region from a region including a background of the object to be removed in the image. An image superimposition processing unit superimposes a complementary image generated from the complementary region on a place from which the removal region is deleted in the image.

12 Claims, 8 Drawing Sheets

(56) References Cited

U.S. PATENT DOCUMENTS

| | | | | |
|---|---|---|---|---|
| 2003/0099406 | A1* | 5/2003 | Georgiev | G06K 9/40 |
| | | | | 382/268 |
| 2010/0329551 | A1* | 12/2010 | Yamazaki | G06K 9/342 |
| | | | | 382/165 |
| 2011/0110585 | A1* | 5/2011 | Kang | G06K 9/00369 |
| | | | | 382/164 |
| 2011/0175984 | A1* | 7/2011 | Tolstaya | H04N 5/272 |
| | | | | 348/46 |
| 2013/0016246 | A1 | 1/2013 | Hatanaka et al. | |
| 2013/0051679 | A1* | 2/2013 | Tsuda | G06K 9/342 |
| | | | | 382/195 |
| 2013/0272602 | A1* | 10/2013 | He | G06T 5/005 |
| | | | | 382/164 |
| 2014/0079341 | A1 | 3/2014 | Ishigami | |
| 2014/0119655 | A1* | 5/2014 | Liu | G06T 7/70 |
| | | | | 382/173 |
| 2015/0134770 | A1* | 5/2015 | Heinz, II | H04L 47/2416 |
| | | | | 709/217 |
| 2016/0171669 | A1* | 6/2016 | Abdollahian | G06T 7/50 |
| | | | | 382/254 |
| 2017/0032192 | A1* | 2/2017 | Teichman | G06K 9/38 |
| 2018/0365887 | A1* | 12/2018 | Wang | G06T 17/00 |

FOREIGN PATENT DOCUMENTS

| | | |
|---|---|---|
| JP | 2011-170838 A | 9/2011 |
| JP | 2012-174116 A | 9/2012 |
| JP | 2013-038468 A | 2/2013 |
| JP | 2013-045316 A | 3/2013 |
| JP | 2013-077873 A | 4/2013 |
| JP | 2013-168048 A | 8/2013 |
| WO | 2013/179560 A1 | 12/2013 |

* cited by examiner

FIG. 2
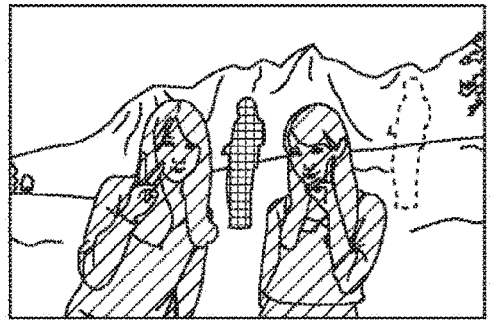
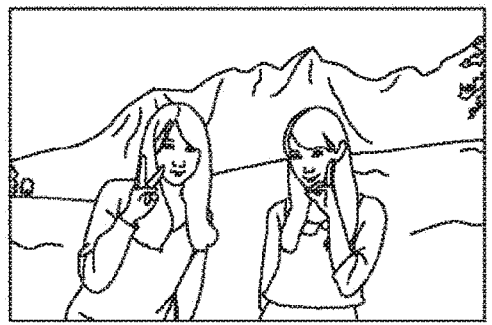

FIG. 4
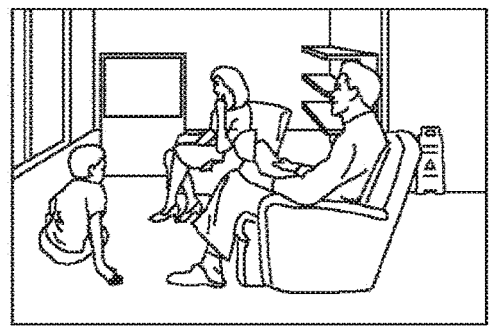
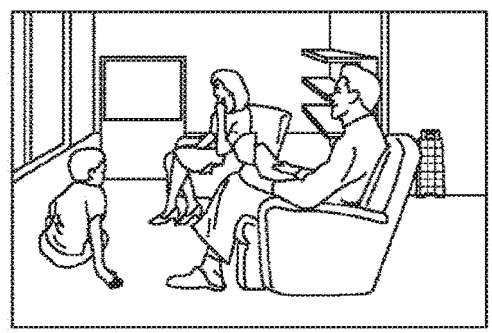
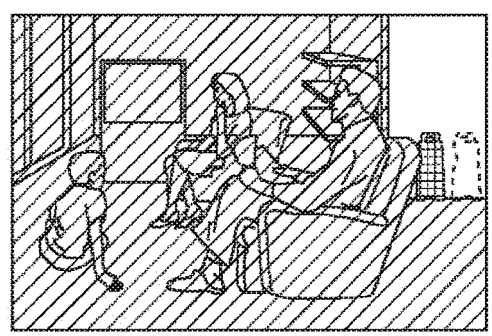
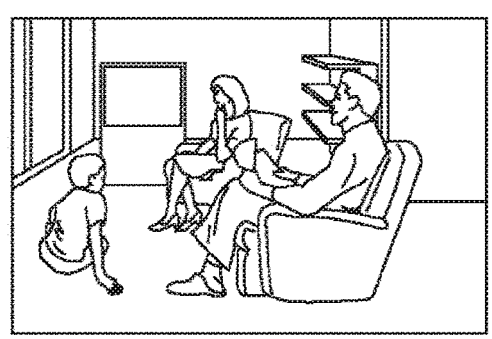

FIG. 5
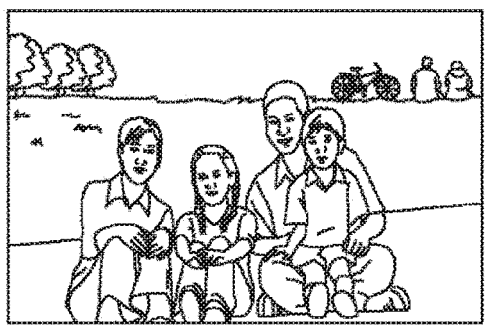
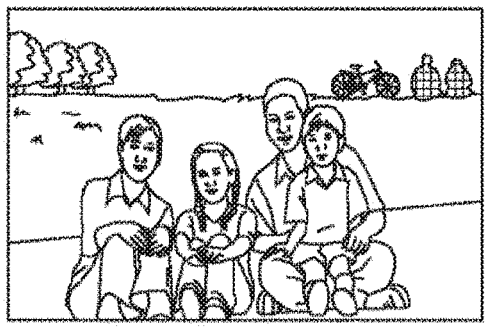
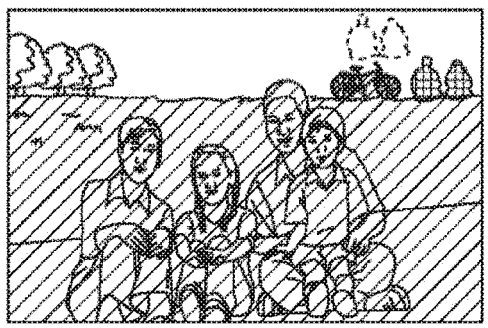
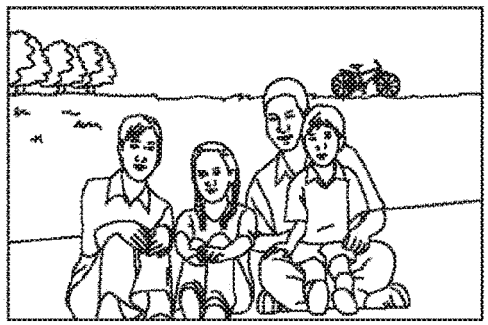

FIG. 6
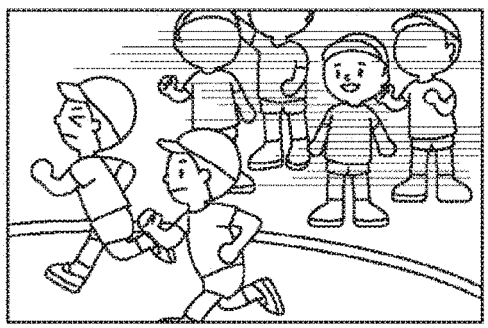
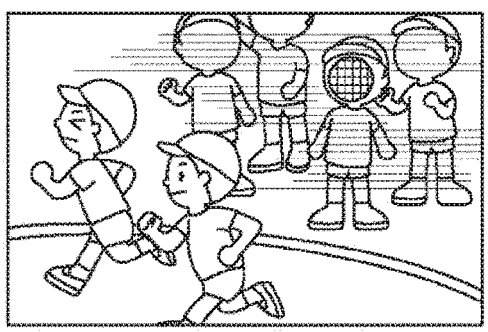
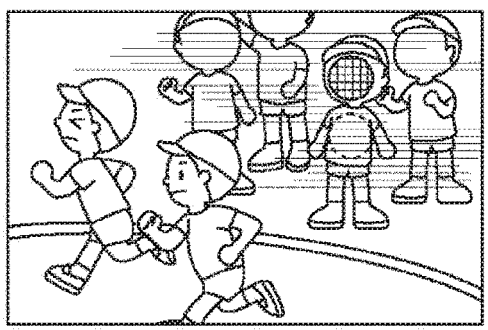
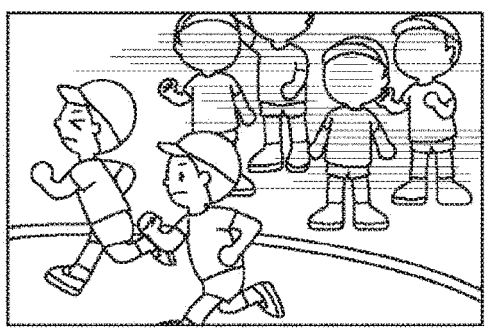

IMAGE PROCESSING DEVICE, IMAGING DEVICE, AND IMAGE PROCESSING METHOD FOR REPLACING SELECTED IMAGE AREA BASED ON DISTANCE

CROSS REFERENCE TO RELATED APPLICATIONS

This application is a U.S. National Phase of International Patent Application No. PCT/JP2018/010396 filed on Mar. 16, 2018, which claims priority benefit of Japanese Patent Application No. JP 2017-069804 filed in the Japan Patent Office on Mar. 31, 2017. Each of the above-referenced applications is hereby incorporated herein by reference in its entirety.

TECHNICAL FIELD

The present disclosure relates to an image processing device, an imaging device, an image processing method, and a program and specifically relates to an image processing device, an imaging device, an image processing method, and a program capable of superimposing an image in such a manner that an appearance becomes more natural.

BACKGROUND ART

Recently, a technology of using augmented reality (AR) to superimpose an image generated by computer graphics on an image captured from a real space has been developed and various services using the technology are provided.

For example, a technology of acquiring an object arranged in a periphery of a location of a mobile terminal, and superimposing and displaying the object including various kinds of information, images, or the like on an image of a real space imaged by an imaging device included in the mobile terminal has been known. Furthermore, a technology of detecting a predetermined marker from an image of a real space which image is acquired by an imaging device included in a mobile terminal, superimposing an object associated with the marker on the image of the real space, and performing displaying thereof on a display included in the mobile terminal has been known.

Furthermore, a technology of correcting a tone of an object on the basis of a tone of a marker arranged in a real space is proposed in Patent Document 1 as a technology considering the tone of the object in superimposition of the object on an image of the real space.

CITATION LIST

Patent Document

Patent Document 1: Japanese Patent Application Laid-Open No. 2012-174116

SUMMARY OF THE INVENTION

Problems to be Solved by the Invention

Incidentally, an extremely high processing capacity has been necessary to perform image processing of superimposing an image in such a manner that an appearance becomes natural in a case where an image generated by computer graphics is superimposed on an image captured from a real space as described above. Therefore, for example, it has been difficult to superimpose an image in such a manner that an appearance becomes natural in a mobile terminal or the like with a limited processing capacity.

The present disclosure has been provided in view of such a condition and is to enable superimposition of an image in such a manner that an appearance becomes more natural.

Solutions to Problems

An image processing device of one aspect of the present disclosure includes: a removal region selecting unit configured to select, from an image acquired by imaging of an arbitrary subject, a region including an intended object to be removed as a removal region with reference to distance information that is acquired in imaging of the image and that indicates a distance to the subject; a complementary region specifying unit configured to specify a complementary region, which is to complement the removal region, from a region including a background of the object to be removed in the image on the basis of the distance information; and an image superimposition processing unit configured to superimpose a complementary image, which is generated from the complementary region, on a place from which the removal region is deleted in the image.

An imaging device of one aspect of the present disclosure includes: an imaging unit configured to image an arbitrary subject; a distance information acquiring unit configured to acquire distance information indicating a distance to the subject of when the image is imaged; a removal region selecting unit configured to select a region, in which an intended object to be removed is included, as a removal region with reference to the distance information; a complementary region specifying unit configured to specify a complementary region, which is to complement the removal region, from a region including a background of the object to be removed in the image on the basis of the distance information; and an image superimposition processing unit configured to superimpose a complementary image, which is generated from the complementary region, on a place from which the removal region is deleted in the image.

An image processing method or a program of one aspect of the present disclosure includes steps of: selecting, from an image acquired by imaging of an arbitrary subject, a region including an intended object to be removed as a removal region with reference to distance information that is acquired in imaging of the image and that indicates a distance to the subject; specifying a complementary region, which is to complement the removal region, from a region including a background of the object to be removed in the image on the basis of the distance information; and superimposing a complementary image, which is generated from the complementary region, on a place from which the removal region is deleted in the image.

In one aspect of the present disclosure, a region including an intended object to be removed is selected as a removal region from an image, which is acquired by imaging of an arbitrary subject, with reference to distance information that is acquired when the image is imaged and that indicates a distance to the subject, a complementary region to complement the removal region is specified from a region, in which a background of the object to be removed is included in the image, on the basis of the distance information, and a complementary image generated from the complementary region is superimposed on a place from which the removal region is deleted in the image.

Effects of the Invention

According to one aspect of the present disclosure, it is possible to superimpose an image in such a manner that an appearance becomes more natural.

BRIEF DESCRIPTION OF DRAWINGS

FIG. 2 is a view for describing image processing to complement a removal region with a background included in a periphery of an object to be removed.

FIG. 4 is a view for describing one example of image processing to complement a removal region with a background substantially at the same distance as an object to be removed.

FIG. 5 is a view for describing one example of image processing to complement a removal region with a background at a greater distance than an object to be removed.

FIG. 6 is a view for describing one example of image processing in a case where an object to be removed is dynamic.

MODE FOR CARRYING OUT THE INVENTION

In the following, a detailed embodiment to which the present technology is applied will be described in detail with reference to the drawings.

Configuration Example of Information Processing Terminal

Figure 1:
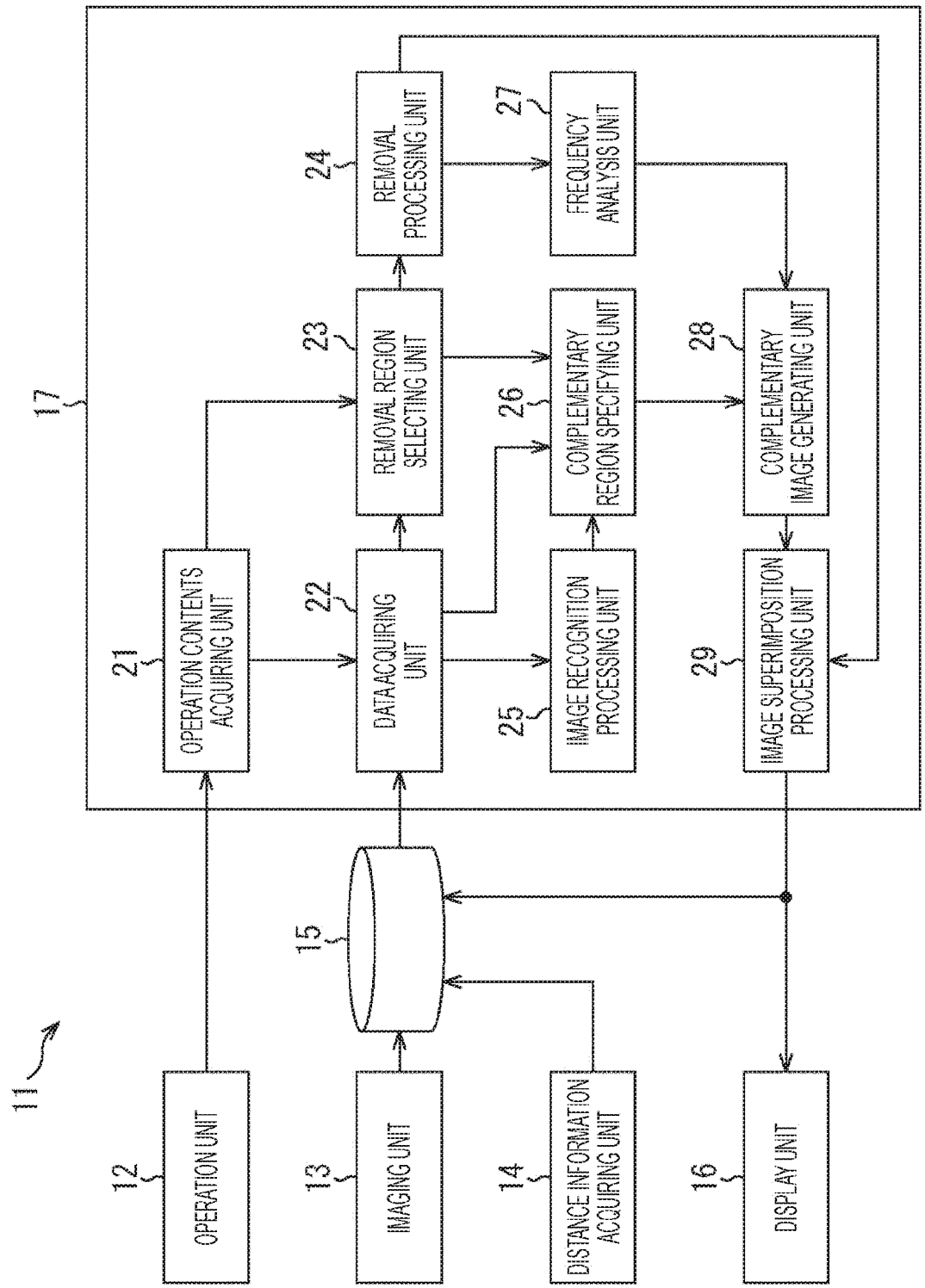
FIG. 1 is a block diagram illustrating a configuration example of one embodiment of an information processing terminal to which the present technology is applied.

FIG. 1 is a block diagram illustrating a configuration example of one embodiment of an information processing terminal to which the present technology is applied.

As illustrated in FIG. 1, an information processing terminal 11 includes an operation unit 12, an imaging unit 13, a distance information acquiring unit 14, a storage unit 15, a display unit 16, and an image processing unit 17. For example, the information processing terminal 11 is a device such as a so-called smartphone that can download and execute various applications. Image processing by the image processing unit 17 can be provided as one function of an application to image an image.

The operation unit 12, for example, includes a touch panel integral with the display unit 16, various physical buttons, or the like and supplies, if operation by a user is performed, an operation signal corresponding to the operation to an operation contents acquiring unit 21 of the image processing unit 17.

The imaging unit 13, for example, includes a charge coupled device (CCD), a complementary metal oxide semiconductor (CMOS) image sensor, or the like, acquires an image captured from a subject, and makes the storage unit 15 perform storing thereof. Furthermore, an image currently being imaged by the imaging unit 13 may be displayed live on the display unit 16.

The distance information acquiring unit 14, for example, includes a time of flight (TOF) sensor to detect reflection of infrared light emitted in a pulsed manner toward a subject, and acquires distance information indicating a distance (depth) to the subject included in an image on the basis of detection timing of the infrared light reflected on the subject.

The storage unit 15, for example, includes a rewritable non-volatile memory, and associates and stores an image imaged by the imaging unit 13 and distance information acquired by the distance information acquiring unit 14 when the image is imaged.

The display unit 16 includes a display device such as a liquid crystal panel or an organic electro luminescence (EL) panel, and displays an image selected by a user as an object of image processing, an image that is the image on which image processing is performed by the image processing unit 17, or the like.

The image processing unit 17 includes an operation contents acquiring unit 21, a data acquiring unit 22, a removal region selecting unit 23, a removal processing unit 24, an image recognition processing unit 25, a complementary region specifying unit 26, a frequency analysis unit 27, a complementary image generating unit 28, and an image superimposition processing unit 29.

According to an operation signal supplied from the operation unit 12 in response to operation by a user, the operation contents acquiring unit 21 acquires operation contents indicating contents of the operation performed by the user, and makes the data acquiring unit 22 and the removal region selecting unit 23 perform processing following the operation contents. For example, if acquiring operation contents of selecting an image that is an object of image processing, the operation contents acquiring unit 21 makes the data acquiring unit 22 acquire an image and distance information according to the operation contents. Furthermore, if acquiring operation contents of designating an object to be removed from an image to be processed (hereinafter, arbitrarily referred to as object to be removed), the operation contents acquiring unit 21 makes the removal region selecting unit 23 select a region including the object to be removed according to the operation contents.

From the storage unit 15, the data acquiring unit 22 reads and acquires an image to be processed, the image being selected by a user, and distance information associated with the image. Then, the data acquiring unit 22 supplies the image and distance information read from the storage unit 15 to the removal region selecting unit 23, the image recognition processing unit 25, and the complementary region specifying unit 26.

From the image to be processed which image is supplied from the data acquiring unit 22, the removal region selecting unit 23 selects a region, which includes the object to be removed which object is designated by the user, as a removal region with reference to distance information of a subject included in the image. For example, the removal region selecting unit 23 can select a removal region by specifying, on the basis of a distance to a subject included in an image, that an object to be removed is included in a predetermined distance width (in predetermined range in depth direction) from a place designated by a user and by further extracting an edge (sudden change in color, brightness, or the like) of the object to be removed. Then, the removal region selecting unit 23 supplies the image to be processed to the removal processing unit 24 and notifies the removal processing unit 24 of a range selected as the removal region. Furthermore, the removal region selecting unit 23 also notifies the complementary region specifying unit 26 of the range selected as the removal region.

The removal processing unit 24 performs image processing of deleting, from an image to be dealt with in processing, the range selected by the removal region selecting unit 23 as the removal region. Then, the removal processing unit 24 supplies the image from which the removal region is deleted to the frequency analysis unit 27 and the image superimposition processing unit 29.

On the basis of the image and distance information supplied from the data acquiring unit 22, the image recognition processing unit 25 performs image recognition processing of recognizing a subject, a composition, or the like included in the image. For example, in a case where a person on a front side of a different subject is included in a larger size in a composition, the image recognition processing unit 25 can acquire a recognition result that the person is a main subject. Then, the image recognition processing unit 25 supplies, to the complementary region specifying unit 26, the recognition result acquired as a result of the image recognition processing performed with respect to the image to be processed.

From the image to be processed which image is supplied from the data acquiring unit 22, the complementary region specifying unit 26 specifies a complementary region to complement the removal region, which is selected by the removal region selecting unit 23, on the basis of the recognition result of the image recognition processing by the image recognition processing unit 25 and the distance information supplied from the data acquiring unit 22. Note that the processing in which the complementary region specifying unit 26 specifies the complementary region will be described with reference to FIG. 2 and FIG. 4 to FIG. 7 described later. Then, the complementary region specifying unit 26 notifies the complementary image generating unit 28 of a range specified as the complementary region from the image to be processed.

The frequency analysis unit 27 performs a frequency analysis with respect to a region including an object that is included in a peripheral region of the removal region and that is substantially at the same distance as the object to be removed (hereinafter, arbitrarily referred to as peripheral object region) in the image in which the removal region is deleted by the removal processing unit 24. Then, for example, the frequency analysis unit 27 supplies a frequency analysis result acquired as a result of a frequency analysis with respect to color information (R, G, and B data) of the peripheral object region to the complementary image generating unit 28.

The complementary image generating unit 28 clips the complementary region specified by the complementary region specifying unit 26 from the image to be processed, and performs image treatment processing of performing treatment such as adding a blur, a noise, or the like based on a result of the frequency analysis with respect to the peripheral object region by the frequency analysis unit 27. With this arrangement, the complementary image generating unit 28 can reduce strangeness between a periphery of the removal region and the complementary image and can generate a more realistic complementary image.

The image superimposition processing unit 29 performs image processing of superimposing the complementary image generated by the complementary image generating unit 28 on a place from which the removal region is deleted from the image to be processed by the removal processing unit 24. Here, the image superimposition processing unit 29 can perform image processing of blurring a boundary line between the periphery of the removal region and the complementary image, image processing of adjusting brightness of the complementary image according to brightness of the periphery of the removal region, or the like. Note that the image superimposition processing unit 29 may perform image processing of daringly leave an outline of the complementary image and may make the complement of the region recognized. With this arrangement, the image superimposition processing unit 29 acquires, as a result of the image processing by the image processing unit 17, an image from which the object to be removed is removed, the object being designated by the user, and which is complemented with the complementary image, makes the storage unit 15 perform storing thereof, and makes the display unit 16 perform displaying thereof.

The information processing terminal 11 is configured in the above manner. Image processing in which the removal region selected by the removal region selecting unit 23 from the image to be processed is deleted, and complement with the complementary image generated by the complementary image generating unit 28 by utilization of the complementary region specified by the complementary region specifying unit 26 is performed is performed. With this arrangement, the information processing terminal 11 can acquire an image from which the object to be removed is removed, the object being designated by the user, and which has a natural appearance with little strangeness between the periphery of the removal region and the complementary image.

With reference to FIG. 2, image processing of complementing a removal region with a background included in a periphery of an object to be removed will be described as an example of the image processing by the image processing unit 17.

For example, it is assumed that an image illustrated in a first stage from a top in FIG. 2 is selected as an object of the image processing and that a user performs operation of designating, as an object of removal, a stranger who is included between two people included as main subjects and who is behind the two people.

According to such operation, the operation contents acquiring unit 21 makes the removal region selecting unit 23 select a region to be removed by giving notification of a place designated by the user. Thus, the removal region selecting unit 23 selects the region to be removed by referring to distance information associated with an image to be processed and extracting an edge of an object to be removed which object is included in the image to be processed. Then, the removal processing unit 24 deletes a removal region selected by the removal region selecting unit 23 from the image to be processed. Note that in a second stage from the top in FIG. 2, the removal region deleted from the image to be processed is indicated by grid hatching.

Furthermore, the image recognition processing unit 25 performs image recognition processing with respect to the image to be processed and supplies, to the complementary region specifying unit 26, a recognition result indicating that two people on a front side of the image are main in the image. Thus, the complementary region specifying unit 26 determines a region other than a region the main two people are included as a complementary image to complement the removal region, and excludes the region where the two people are included from a region where the complementary region is specified. Note that in a third stage from the top in FIG. 2, a region excluded from the specification of the complementary region is indicated by hatching with a diagonal line.

Then, the complementary region specifying unit 26 specifies a complementary region used for generation of a complementary image from a background region that is included in a periphery of the object to be removed and that is other than a region including the main two people in the image to be processed. For example, in the example illustrated in FIG. 2, a far mountain is hidden by an upper body of a person that is an object to be removed, and a ground below is hidden by a lower body of the person who is the object to be removed. Thus, the complementary region specifying unit 26 specifies a complementary region in which the upper body becomes a color of the mountain and the lower body becomes a color of the ground. Note that in the third stage from the top in FIG. 2, a complementary region specified by the complementary region specifying unit 26 is surrounded by a broken line.

Subsequently, the complementary image generating unit 28 generates a complementary image by clipping the complementary region specified by the complementary region specifying unit 26 from the image to be processed and by performing treatment processing of performing treatment such as adding a blur, a noise, or the like based on a frequency analysis result with respect to a peripheral object region. Moreover, the image superimposition processing unit 29 performs image processing of superimposing the complementary image generated by the complementary image generating unit 28 on a place from which the removal region is deleted from the image to be processed by the removal processing unit 24. With this arrangement, as illustrated in a fourth stage from the top in FIG. 2, an image from which the object to be removed is removed, the object being designated by the user, and which is complemented with the background included in the periphery of the object to be removed is acquired.

In such a manner, in the image processing unit 17, the removal region selecting unit 23 can easily specify a removal region with reference to the distance information. For example, even if the information processing terminal 11 is a smartphone on which a removal region is designated with a touch panel, the removal region selecting unit 23 can highly-accurately specify the removal region with reference to distance information of a place touched by a user.

Moreover, the image processing unit 17 can execute image processing of acquiring an appearance, in which an object to be removed is more naturally removed, while avoiding acquiring an unnatural image in which a removal region is complemented with a main subject.

In other words, in a case of performing image processing of generating an image from which an object to be removed is removed by simply using an image in a periphery of a removal region, there is a case where the removal region is complemented with a region including a main subject if the main subject is included in vicinity of the removal region. In this case, complement with a subject on a front side of the object to be removed is performed. Thus, for example, it is assumed that an unnatural image in which the subject has double outlines is acquired. On the other hand, the image processing unit 17 can avoid acquiring such an unnatural image by specifying a complementary region in the above-described manner.

As described above, the image processing unit 17 can appropriately specify a complementary region from a background included in a periphery of an object to be removed and can acquire an image from which the object to be removed is more naturally removed.

Furthermore, by performing image processing with reference to distance information, the image processing unit 17 can reduce calculation compared to specification of a removal region only on the basis of image recognition, for example. With this arrangement, for example, even if the information processing terminal 11 is a mobile device in which a processing capacity of a central processing unit (CPU), a graphics processing cluster (GPC), or the like is limited, image processing of acquiring an image with a more natural appearance can be executed.

Flowchart of Image Processing

Figure 3:
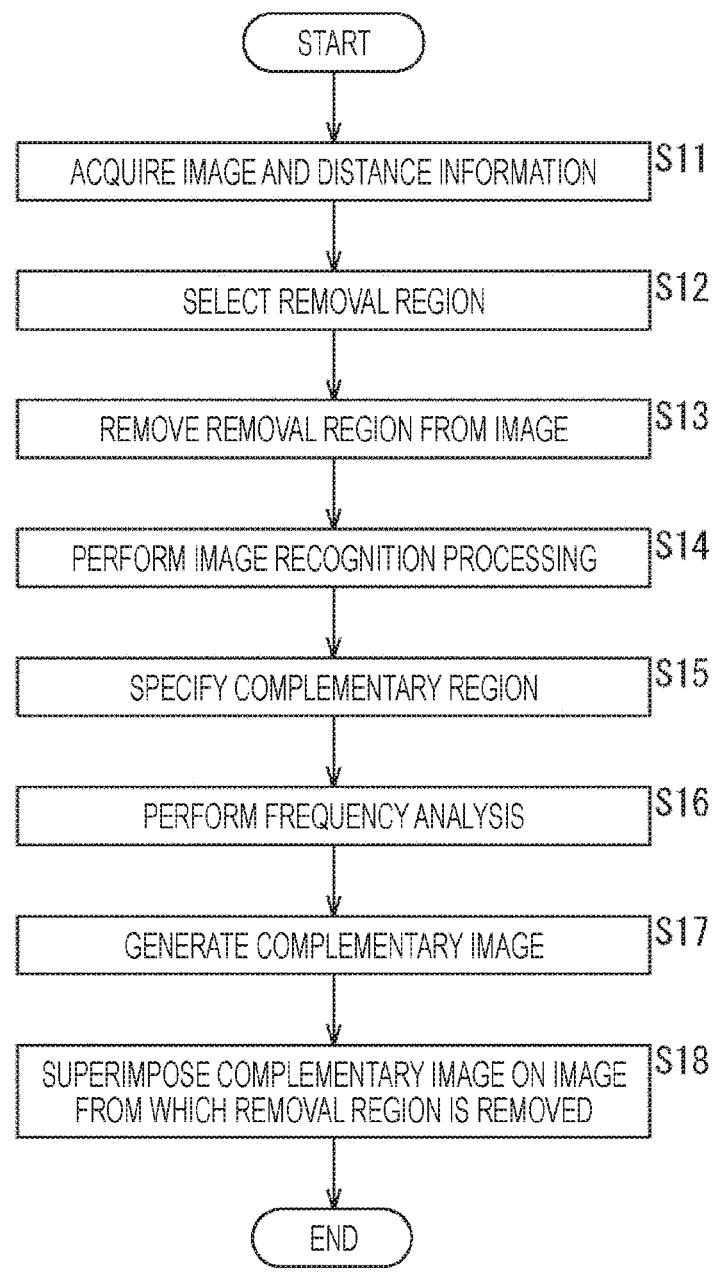
FIG. 3 is a flowchart for describing image processing by an image processing unit.

FIG. 3 is a flowchart for describing image processing executed by the image processing unit 17.

For example, processing is started if a user operates the operation unit 12 and selects an image to be an object of image processing. In step S11, the operation contents acquiring unit 21 acquires operation contents corresponding to the operation by the user and notifies the data acquiring unit 22 of an image selected as the object of processing. In response to this, the data acquiring unit 22 acquires the image to be processed, the image being selected by the user, and distance information associated with the image, and supplies these to the removal region selecting unit 23, the image recognition processing unit 25, and the complementary region specifying unit 26. Here, the image selected by the user is displayed on the display unit 16.

In step S12, if the user performs operation of designating an object to be removed with respect to the image displayed on the display unit 16, the operation contents acquiring unit 21 acquires operation contents corresponding to the operation by the user and supplies this to the removal region selecting unit 23. In response to this, the removal region selecting unit 23 selects a region including the object to be removed, the object being designated by the user, as a removal region from the image to be processed, the image being supplied from the data acquiring unit 22 in step S11, by referring to distance information of a subject included in the image and extracting an edge of the object to be removed which object is included in the image to be processed. Then, the removal region selecting unit 23 supplies the image to be processed to the removal processing unit 24 and notifies the removal processing unit 24 and the complementary region specifying unit 26 of a range selected as the removal region.

In step S13, the removal processing unit 24 performs image processing of deleting the removal region from the image to be processed which image is supplied from the removal region selecting unit 23 in step S12. Then, the removal processing unit 24 supplies the image from which the removal region is deleted to the frequency analysis unit 27 and the image superimposition processing unit 29.

In step S14, on the basis of the image and distance information supplied from the data acquiring unit 22 in step S11, the image recognition processing unit 25 performs image recognition processing of recognizing a subject included in the image. For example, as described above with reference to FIG. 2, the image recognition processing unit 25 recognizes a person who is main in a composition in the image to be processed, and supplies a region including the person to the complementary region specifying unit 26 as a recognition result of the image recognition processing.

In step S15, on the basis of the distance information supplied from the data acquiring unit 22 in step S11 and the recognition result of the image recognition processing by the image recognition processing unit 25 in step S14, the complementary region specifying unit 26 specifies a complementary region to complement the removal region selected by the removal region selecting unit 23. For example, as described with reference to FIG. 2, the complementary region specifying unit 26 specifies a complementary region used for generation of a complementary image from a background region that is included in a periphery of the object to be removed and that is other than a region including the main person in the image to be processed.

In step S16, the frequency analysis unit 27 performs a frequency analysis with respect to a peripheral object region in the image from which the removal region is deleted and which is supplied from the removal processing unit 24 in step S13, and supplies a result of the frequency analysis to the complementary image generating unit 28.

In step S17, the complementary image generating unit 28 clips the complementary region, which is specified by the complementary region specifying unit 26 in step S15, from the image to be processed. Then, the complementary image generating unit 28 performs treatment processing of performing treatment such as adding a blur, a noise, or the like with respect to the clipped image on the basis of the result of the frequency analysis by the frequency analysis unit 27, and supplies this to the image superimposition processing unit 29.

In step S18, the image superimposition processing unit 29 performs image processing of superimposing the complementary image, which is generated by the complementary image generating unit 28 in step S17, on a place from which the removal region is deleted from the image to be processed by the removal processing unit 24 in step S13. With this arrangement, the image processing is ended after the image superimposition processing unit 29 acquires, as a result of the image processing by the image processing unit 17, an image from which the object to be removed is removed, the object being designated by the user, and which is complemented with the complementary image, makes the storage unit 15 perform storing thereof, and makes the display unit 16 perform displaying thereof.

As described above, the image processing unit 17 can appropriately generate a complementary image to complement a removal region from a background included in a periphery of an object to be removed, and can execute image processing of acquiring an image from which the object to be removed is more naturally removed.

Various Image Processing Example

With reference to FIG. 4 to FIG. 7, examples of various kinds of image processing executed by the image processing unit 17 will be described.

First, with reference to FIG. 4, image processing of complementing a removal region with a background substantially at the same distance as an object to be removed will be described.

For example, it is assumed that an image in a manner illustrated in a first stage from a top in FIG. 4 is selected as an object of image processing and that a user performs operation of designating, as an object of removal, an object placed near a wall on a back side of a plurality of people included in an image.

According to such operation, the operation contents acquiring unit 21 makes the removal region selecting unit 23 select a region to be removed by giving notification of a place designated by the user. Thus, the removal region selecting unit 23 selects the region to be removed by referring to distance information associated with an image to be processed and extracting an edge of an object to be removed which object is included in the image to be processed. Then, the removal processing unit 24 deletes a removal region selected by the removal region selecting unit 23 from the image to be processed. Note that in a second stage from the top in FIG. 4, the removal region deleted from the image to be processed is indicated by grid hatching.

Furthermore, the image recognition processing unit 25 performs image recognition processing with respect to the image to be processed and supplies, to the complementary region specifying unit 26, a recognition result indicating that the object to be removed is placed near a wall, that is, there is a wall substantially at the same distance on a back side of the object to be removed. Thus, the complementary region specifying unit 26 determines to use a region including the wall as a complementary image to complement the removal region, and excludes a region other than the wall from a region where the complementary region is specified. Note that in a third stage from the top in FIG. 4, the region excluded from the specification of the complementary region is indicated by hatching with a diagonal line.

Then, the complementary region specifying unit 26 specifies a complementary region used for generation of a complementary image from a background region that is included in a periphery of the object to be removed and that includes the wall substantially at the same distance as the object to be removed in the image to be processed. For example, in the example illustrated in FIG. 4, the complementary region specifying unit 26 specifies a region including a wall adjacent to an object to be removed as a complementary region. Note that in the third stage from the top in FIG. 4, the complementary region specified by the complementary region specifying unit 26 is surrounded by a broken line.

Subsequently, the complementary image generating unit 28 generates a complementary image by clipping the complementary region specified by the complementary region specifying unit 26 from the image to be processed and by performing treatment processing of performing treatment such as adding a blur, a noise, or the like based on a frequency analysis result with respect to a peripheral object region. Moreover, the image superimposition processing unit 29 performs image processing of superimposing the complementary image generated by the complementary image generating unit 28 on a place from which the removal region is deleted from the image to be processed in the removal processing unit 24. With this arrangement, as illustrated in a fourth stage from the top in FIG. 4, an image from which the object to be removed is removed, the object being designated by the user, and which is complemented with the wall substantially at the same distance as the object to be removed is acquired.

As described above, the image processing unit 17 can complement a removal region with a background substantially at the same distance as an object to be removed, and can acquire an image on which a complementary image is superimposed in such a manner that an appearance becomes more natural.

Next, image processing of complementing a removal region with a background at a greater distance than an object to be removed will be described with reference to FIG. 5.

For example, it is assumed that an image in a manner illustrated in a first stage from a top in FIG. 5 is selected as an object of image processing and that a user performs operation of designating, as an object of removal, a person sitting farther than a plurality of people included in an image.

According to such operation, the operation contents acquiring unit 21 makes the removal region selecting unit 23 select a region to be removed by giving notification of a place designated by the user. Thus, the removal region selecting unit 23 selects the region to be removed by referring to distance information associated with an image to be processed and extracting an edge of an object to be removed which object is included in the image to be processed. Then, the removal processing unit 24 deletes a removal region selected by the removal region selecting unit 23 from the image to be processed. Note that in a second stage from the top in FIG. 5, the removal region deleted from the image to be processed is indicated by grid hatching.

Furthermore, the image recognition processing unit 25 performs image recognition processing with respect to the image to be processed and supplies, to the complementary region specifying unit 26, a recognition result indicating that an object to be removed is in a position away from a main subject for a predetermined distance or more and is far in a degree that assumption as an almost scenery can be made. Thus, the complementary region specifying unit 26 determines to use a region including a background at a greater distance than the object to be removed as a complementary image to complement the removal region, and excludes a region other than the background from a region where the complementary region is specified. Here, the complementary region specifying unit 26 also excludes a region including a different object (bicycle in example in FIG. 5) placed at a distance in the same degree as that of the object to be removed from the region where the complementary region is specified. Note that in a third stage from the top in FIG. 5, the region excluded from the specification of the complementary region is indicated by hatching with a diagonal line.

Then, the complementary region specifying unit 26 specifies a complementary region used for generation of a complementary image from a background region that is included in a periphery of the object to be removed in the image to be processed and that is a region including the background at a greater distance than the object to be removed in the image to be processed. For example, in the example illustrated in FIG. 5, the complementary region specifying unit 26 specifies, as the complementary region, a region which is in the vicinity of the object to be removed and from which a bicycle placed at a distance in the same degree as the object to be removed is excluded. Note that in the third stage from the top in FIG. 5, the complementary region specified by the complementary region specifying unit 26 is surrounded by a broken line.

Then, the complementary image generating unit 28 generates a complementary image by clipping the complementary region specified by the complementary region specifying unit 26 from the image to be processed and by performing treatment processing of performing treatment such as adding a blur, a noise, or the like based on a frequency analysis result with respect to a peripheral object region. Moreover, the image superimposition processing unit 29 performs image processing of superimposing the complementary image generated by the complementary image generating unit 28 on a place from which the removal region is deleted from the image to be processed in the removal processing unit 24. With this arrangement, as illustrated in a fourth stage from the top in FIG. 5, an image from which the object to be removed is removed, the object being designated by the user, and which is complemented with the background at a greater distance than the object to be removed is acquired.

As described above, the image processing unit 17 can complement a removal region with a background at a greater distance than an object to be removed, and can acquire an image on which a complementary image is superimposed in such a manner that an appearance becomes more natural.

Next, image processing of a case where an object to be removed is dynamic will be described with reference to FIG. 6.

For example, it is assumed that an image in a manner illustrated in a first stage from a top in FIG. 6 is selected by a user as an object of image processing. Here, an image to be processed is imaged with a running person as a main subject by so-called panning along with a movement of the subject. A shake flowing in a horizontal direction is generated with respect to people included in a background of the subject. Incidentally, in such an image imaged by panning, there is a case where a face of a person included in a background can be recognized. A user performs operation of designating the face of the person included in the background as an object of removal.

According to such operation, the operation contents acquiring unit 21 makes the removal region selecting unit 23 select a region to be removed by giving notification of a place designated by the user. Thus, the removal region selecting unit 23 selects the region to be removed by referring to distance information associated with an image to be processed and performing face recognition with respect to an object to be removed which object is included in the image to be processed. Then, the removal processing unit 24 deletes a removal region selected by the removal region selecting unit 23 from the image to be processed. Note that in a second stage from the top in FIG. 6, the removal region deleted from the image to be processed is indicated by grid hatching.

Furthermore, the image recognition processing unit 25 performs image recognition processing with respect to the image to be processed and supplies, to the complementary region specifying unit 26, a recognition result indicating that a shake in a flowing manner is generated in a periphery of the object to be removed. Thus, as a complementary image to complement the removal region, the complementary region specifying unit 26 specifies a complementary region used for generation of the complementary image from a region where the shake in a flowing manner is generated in the periphery of the object to be removed. For example, in the example illustrated in FIG. 6, a region of a trunk part of a person whose face is selected as a region to be removed is specified as a complementary region. Note that in a third stage from the top in FIG. 6, the complementary region specified by the complementary region specifying unit 26 is surrounded by a broken line.

Subsequently, the complementary image generating unit 28 generates a complementary image by clipping the complementary region specified by the complementary region specifying unit 26 from the image to be processed and by performing treatment processing of performing treatment such as adding a blur, a noise, or the like based on a frequency analysis result with respect to a peripheral object region. Moreover, the image superimposition processing unit 29 performs image processing of superimposing the complementary image generated by the complementary image generating unit 28 on a place from which the removal region is deleted from the image to be processed by the removal processing unit 24. With this arrangement, an image from which the object to be removed is removed, the object being designated by the user, and which is complemented in such a manner as to be dynamic with a flowing shake similarly to the periphery of the object to be removed is acquired as illustrated in a fourth stage from the top in FIG. 6.

As described above, the image processing unit 17 can complement a removal region in which a flowing shake is generated similarly to a periphery of an object to be removed, and can acquire an image on which a complementary image is superimposed in such a manner that an appearance becomes more natural.

For example, in a case where complement simply with a color in a periphery of a removal region is performed, a non-dynamic image in which only the complemented region is still is acquired, and an image with strangeness with respect to the flowing shake in the periphery of the object to be removed is acquired. On the other hand, by avoiding including an image in which a removal region is still, the image processing unit 17 can acquire an image in which even a removal region is dynamic similarly to a periphery and which has no such strangeness.

Next, with reference to FIG. 7, image processing of a case where an object to be removed spreads to a wide range will be described.

Figure 7:
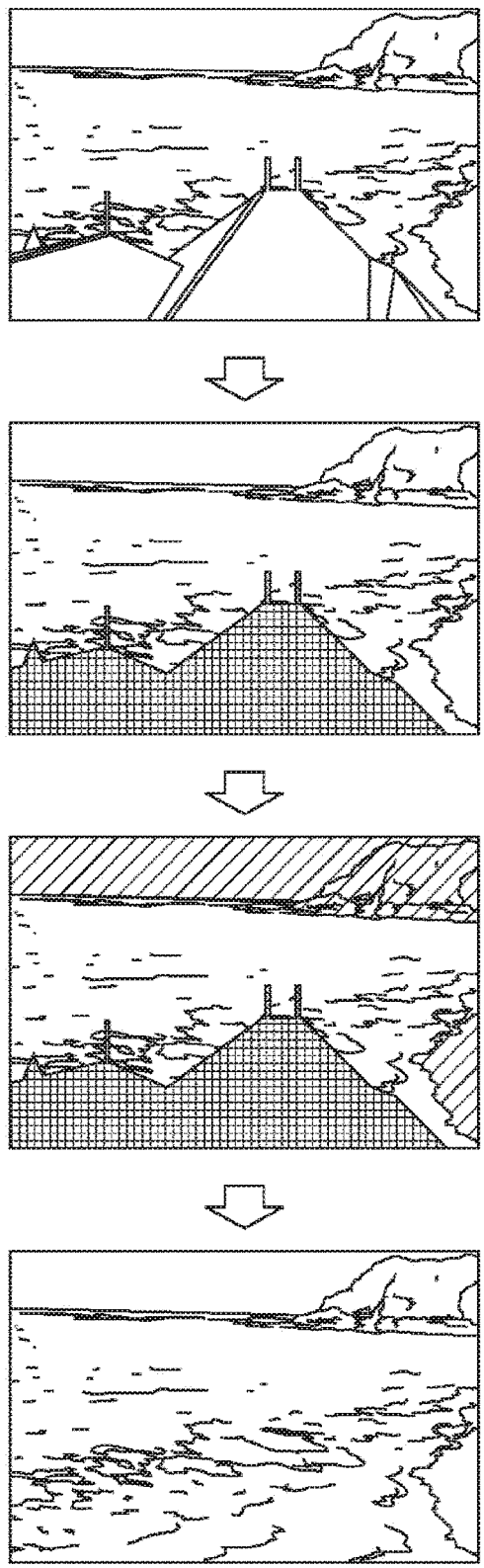
FIG. 7 is a view for describing one example of image processing in a case where an object to be removed spread in a wide range.

For example, it is assumed that an image in a manner illustrated in a first stage from a top in FIG. 7 is selected as an object of image processing, and that a user performs operation of designating a roof included on a front side in the image as an object of removal.

According to such operation, the operation contents acquiring unit 21 makes the removal region selecting unit 23 select a region to be removed by giving notification of a place designated by the user. Thus, the removal region selecting unit 23 selects the region to be removed by referring to distance information associated with an image to be processed and extracting an edge of an object to be removed which object is included in the image to be processed. Then, the removal processing unit 24 deletes a removal region selected by the removal region selecting unit 23 from the image to be processed. Note that in a second stage from the top in FIG. 7, the removal region deleted from the image to be processed is indicated by grid hatching.

Furthermore, the image recognition processing unit 25 performs image recognition processing with respect to the image to be processed, checks a color surrounding the object to be removed, performs acquisition as a recognition result, and supplies, to the complementary region specifying unit 26, the recognition result of the image recognition processing which result indicates that a background hidden by the object to be removed is a sea in a wide range. Thus, the complementary region specifying unit 26 determines to use a region including the sea as a complementary image to complement the removal region, and excludes a region other than the sea from a region where the complementary region is specified. Note that in a third stage from the top in FIG. 7, a region excluded from the specification of the complementary region (such as rocky area, sky surrounding sea, or the like) is indicated by hatching with a diagonal line.

Then, the complementary region specifying unit 26 specifies a complementary region used for generation of a complementary image from a background region included in a manner of surrounding a periphery of the object to be removed in the image to be processed. For example, in the example illustrated in FIG. 7, a whole region including the sea surrounding a periphery of an object to be removed is specified as a complementary region.

Subsequently, the complementary image generating unit 28 generates a complementary image by clipping the complementary region specified by the complementary region specifying unit 26 from the image to be processed and by performing treatment processing of performing treatment such as adding a blur, a noise, or the like based on a frequency analysis result with respect to a peripheral object region. Moreover, the image superimposition processing unit 29 performs image processing of superimposing the complementary image generated by the complementary image generating unit 28 on a place from which the removal region is deleted from the image to be processed by the removal processing unit 24. With this arrangement, as illustrated in a fourth stage from the top in FIG. 7, an image from which the object to be removed is removed, the object being designated by the user, and which is complemented with utilization of the sea (or color of the sea) included in a manner of surrounding the periphery of the object to be removed without utilization of the rocky area, the sky, or the like other than the sea is acquired.

As described above, even if an object to be removed is in a wide range, the image processing unit 17 can complement a removal region with a background included in a manner of surrounding the object to be removed and can acquire an image on which a complementary image is superimposed in such a manner that an appearance becomes more natural.

As described with reference to FIG. 2 and FIG. 4 to FIG. 7 described above, the image processing unit 17 can perform various kinds of image processing to remove an object to be removed, the object being designated by the user, in a natural manner. Note that image processing executed by the image processing unit 17 is not limited to the above-described image processing examples.

For example, the image processing unit 17 can perform image processing of removing an object to be removed in a natural manner, when performing imaging by the information processing terminal 11, as an effect with respect to an image acquired as a result of the imaging in addition to an already-imaged image recorded in the storage unit 15. Furthermore, the image processing unit 17 can perform similar image processing not only on a still image but also on a moving image. For example, it is possible to follow and remove a recognized object to be removed. In this case, an image on which image processing is performed by the image processing unit 17 is displayed on the display unit 16 in real time.

Furthermore, a TOF sensor in the above-described manner is not necessarily employed as the distance information acquiring unit 14, and various technologies capable of acquiring distance information can be employed. For example, a configuration in which an imaging unit 13 and a distance information acquiring unit 14 are formed integrally in such a manner that a pixel of acquiring distance information is embedded in a part of a pixel arranged on a sensor surface of the imaging unit 13 may be employed.

Note that on the basis of an aberration of a lens that collects light on the imaging unit 13, the image processing unit 17 may perform correction of daringly generate distortion due to the aberration of the lens with respect to a complementary image superimposed on an image. For example, since distortion of a space due to the lens varies according to a distance to a subject, the image processing unit 17 can acquire a more realistic image by generating distortion in the complementary image according to distance information of an object to be removed.

Moreover, the image processing unit 17 can calculate a moving speed of the information processing terminal 11 on the basis of a variation in distance information of a whole image, and the complementary image generating unit 28 can generate a complementary image by correcting the moving speed. For example, even if the moving speed of the information processing terminal 11 is constant, a moving amount on an image of a far object is smaller than that of a close object. More specifically, in a case where a user riding on a train images the outside of the train, a cable pole or the like near the train appears on an image only for a moment while a moving amount on the image of a far mountain is small. In such a manner, it is possible to acquire a more natural image by correcting a complementary image, which is superimposed on the image, at a moving speed corresponding to a distance to a subject.

Furthermore, the image processing unit 17 can estimate lighting with respect to an object to be removed on the basis of distance information of the object to be removed and color information (R, G, and B data) in a periphery of the object to be removed, and the complementary image generating unit 28 can generate a complementary image by correcting the lighting. Thus, the image processing unit 17 can improve reality of an image from which an object to be removed is removed and which is complemented with a complementary image.

Incidentally, a technology of improving reality of an image complemented with a complementary image described herein is not necessarily limited to what is applied to a complementary image clipped from an image to be processed. In other words, image processing by the image processing unit 17 can be applied to various different images and can be applied, for example, to an arbitrary computer graphics (CG) image that is generated by computer graphics and is superimposed on an image captured from a real space in an AR technology.

Here, the complementary image generating unit 28 can perform, with respect to a CG image supplied from a CG image generating unit (not illustrated), image treatment processing of performing treatment such as adding a blur, a noise, or the like based on a result of a frequency analysis performed by the frequency analysis unit 27 with respect to a peripheral object region of a region on which the CG image is superimposed. In addition, the complementary image generating unit 28 can improve reality in superimposition a CG image on an image captured from a real space by performing image treatment processing such as generating distortion due to an aberration of a lens, performing correction on the basis of a moving speed, or correcting lighting in a manner described above. Alternatively, the complementary image generating unit 28 may perform image treatment processing of adjusting resolution of a CG image according to resolution of an image captured from a real space.

By performing such various kinds of image treatment processing, for example, it is possible to avoid standing out only of a CG image from a periphery and to make the CG image assimilate into a peripheral region when the CG image is superimposed on an image captured from a real space. With this arrangement, the CG image fits in the image captured from the real space and an appearance can be more natural.

Note that in a case where image processing by the image processing unit 17 is applied to an AR technology, the removal region selecting unit 23 can refer to distance information of a subject included in an image to be processed and can, for example, specify a region on which a CG image is superimposed according to a composition of the subject on the basis of image recognition processing by the image recognition processing unit 25 with respect to the image. Then, the removal region selecting unit 23 can select the specified region as a removal region hidden by superimposition of the CG image (region where object to be removed is not specifically included). Thus, in this case, the image superimposition processing unit 29 can perform image processing of superimposing a CG image, on which image treatment processing is performed by the complementary image generating unit 28, on the region specified by the removal region selecting unit 23.

Moreover, an image superimposed by such image processing is not limited to a CG image, and an intended image can be superimposed. For example, an intended image acquired by clipping, from an arbitrary moving image imaging an intended subject, of a region including the subject may be superimposed with the above-described image captured from the real space as a background. At that time, synthesis without strangeness is possible by the above-described image treatment processing with respect to the intended image.

Note that each kind of processing described with reference to the above-described flowchart is not necessarily performed in a time series in order described in the flowchart. Processing executed in parallel or individually (such as parallel processing or processing by object) is also included. Furthermore, a program may be processed by a single CPU or may be processed in a distributed manner by a plurality of CPUs.

Furthermore, the above-described series of processing (image processing method) can be executed by hardware or can be executed by software. In a case where the series of processing is executed by software, a program included in the software is installed from a program recording medium in which the program is recorded, for example, into a computer embedded in special hardware, or a general personal computer or the like that can execute various functions by installation of various programs.

Figure 8:
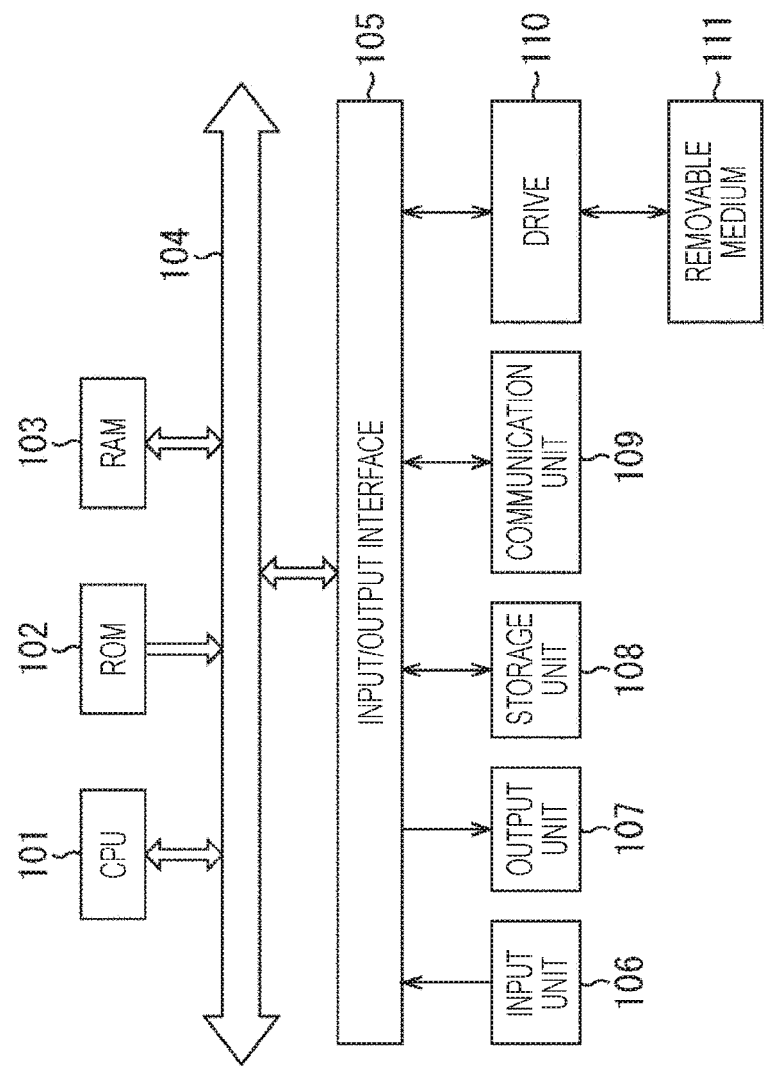
FIG. 8 is a block diagram illustrating a configuration example of one embodiment of a computer to which the present technology is applied.

FIG. 8 is a block diagram illustrating a configuration example of hardware of a computer to execute the above-described series of processing by a program.

In a computer, a central processing unit (CPU) 101, a read only memory (ROM) 102, and a random access memory (RAM) 103 are connected to each other by a bus 104.

To the bus 104, an input/output interface 105 is further connected. To an input/output interface 105, an input unit 106 including a keyboard, a mouse, a microphone, or the like, an output unit 107 including a display, a speaker, or the like, a storage unit 108 including a hard disk, a non-volatile memory, or the like, a communication unit 109 including a network interface or the like, and a drive 110 to drive a removable medium 111 such as a magnetic disk, an optical disk, a magnetooptical disk, or a semiconductor memory are connected.

In the computer configured in the above manner, for example, the CPU 101 loads a program stored in the storage unit 108 into the RAM 103 through the input/output interface 105 and the bus 104 and executes the program, whereby the above-described series of processing is performed.

A program executed by the computer (CPU 101) is provided, for example, by being recorded in the removable medium 111 that is a package medium including a magnetic disk (including flexible disk), an optical disk (such as compact disc-read only memory (CD-ROM) or digital versatile disc (DVD)), a magnetooptical disk, a semiconductor memory, or the like or through a wired or wireless transmission medium such as a local area network, the Internet, or digital satellite broadcasting.

Then, by attachment of the removable medium 111 to the drive 110, the program can be installed into the storage unit 108 through the input/output interface 105. Furthermore, the program can be received in the communication unit 109 through the wired or wireless transmission medium and can be installed into the storage unit 108. Alternatively, the program can be previously installed in the ROM 102 or the storage unit 108.

Example of Combination of Configuration

Note that the present technology may include the following configurations.

(1)

An image processing device including:

a removal region selecting unit configured to select, from an image acquired by imaging of an arbitrary subject, a region including an intended object to be removed as a removal region with reference to distance information that is acquired in imaging of the image and that indicates a distance to the subject;

a complementary region specifying unit configured to specify a complementary region, which is to complement the removal region, from a region including a background of the object to be removed in the image on the basis of the distance information; and an image superimposition processing unit configured to superimpose a complementary image generated from the complementary region on a place from which the removal region is deleted in the image.

(2)

The image processing device according to (1), further including a complementary image generating unit configured to generate the complementary image by clipping the complementary region specified by the complementary region specifying unit from the image.

(3)

The image processing device according to (1) or (2), further including a frequency analysis unit configured to perform a frequency analysis with respect to a region including an object substantially at the same distance as the object to be removed in a periphery of the removal region, in which the complementary image generating unit performs, with respect to the complementary image clipped from the image, image treatment processing of adding a blur or a noise based on a result of the frequency analysis by the frequency analysis unit.

(4)

The image processing device according to any one of (1) to (3), further including an image recognition processing unit configured to recognize the subject included in the image, and a composition of the subject, in which the complementary region specifying unit specifies the complementary region on the basis of a recognition result acquired by the image recognition processing unit.

(5)

The image processing device according to (4), in which the image recognition processing unit acquires, in a case where a person on a front side of a different subject is included in a larger size in a composition, a recognition result indicating that the person is a main subject on the basis of the distance information, and the complementary region specifying unit specifies the complementary region from a region other than where the person recognized as the main subject is included on the basis of the recognition result acquired by the image recognition processing unit.

(6)

The image processing device according to (4), in which the image recognition processing unit acquires, on the basis of the distance information, a recognition result indicating that there is a different object substantially at the same distance on a back side of the object to be removed, and the complementary region specifying unit specifies, on the basis of the recognition result acquired by the image recognition processing unit, the complementary region from a region including the different object substantially at the same distance as the object to be removed.

(7)

The image processing device according to (4), in which the image recognition processing unit acquires, on the basis of the distance information, a recognition result indicating that the object to be removed is in a position away for a predetermined distance or more, and the complementary region specifying unit specifies the complementary region from a region including a background at a greater distance than the object to be removed on the basis of the recognition result acquired by the image recognition processing unit.

(8)

The image processing device according to (4), in which the image recognition processing unit acquires a recognition result indicating that a flowing shake is generated in a periphery of the object to be removed, and the complementary region specifying unit specifies the complementary region from a region where the flowing shake is generated in the periphery of the object to be removed on the basis of the recognition result acquired by the image recognition processing unit.

(9)

The image processing device according to (4), in which the image recognition processing unit acquires, as a recognition result, a color surrounding a periphery of the object to be removed, and the complementary region specifying unit excludes, on the basis of the recognition result acquired by the image recognition processing unit, a region other than what having the color from a region where the complementary region is specified.

(10)

The image processing device according to (3) or (4), in which in superimposition of an intended image with the image as a background, the removal region selecting unit selects a region, which is hidden by superimposition of the intended image, as the removal region with reference to the distance information, the complementary image generating unit performs, with respect to the intended image, image treatment processing of adding a blur or a noise based on a result of the frequency analysis by the frequency analysis unit, and the image superimposition processing unit superimposes the intended image, on which the image treatment processing is performed by the complementary image generating unit, on the region selected by the removal region selecting unit.

(11)

An imaging device including:

an imaging unit configured to image an arbitrary subject;

a distance information acquiring unit configured to acquire distance information indicating a distance to the subject of when the image is imaged;

a removal region selecting unit configured to select a region, in which an intended object to be removed is included, as a removal region with reference to the distance information;

a complementary region specifying unit configured to specify, on the basis of the distance information, a complementary region to complement the removal region from a region in which a background of the object to be removed is included in the image; and an image superimposition processing unit configured to superimpose a complementary image, which is generated from the complementary region, on a place from which the removal region is deleted in the image.

(12)

An image processing method including steps of:

selecting, from an image acquired by imaging of an arbitrary subject, a region including an intended object to be removed as a removal region with reference to distance information that is acquired in imaging of the image and that indicates a distance to the subject;

specifying, on the basis of the distance information, a complementary region to complement the removal region from a region in which a background of the object to be removed is included in the image; and superimposing a complementary image generated from the complementary region on a place from which the removal region is deleted in the image.

(13)

A program for causing a compute to execute image processing including steps of:

selecting, from an image acquired by imaging of an arbitrary subject, a region including an intended object to be removed as a removal region with reference to distance information that is acquired in imaging of the image and that indicates a distance to the subject;

specifying, on the basis of the distance information, a complementary region to complement the removal region from a region in which a background of the object to be removed is included in the image; and superimposing a complementary image generated from the complementary region on a place from which the removal region is deleted in the image.

Note that the present embodiment is not limited to the above-described embodiment and various modifications can be made within the spirit and the scope of the present disclosure.

REFERENCE SIGNS LIST

11 Information processing terminal
12 Operation unit
13 Imaging unit
14 Distance information acquiring unit
15 Storage unit
16 Display unit
17 Image processing unit
21 Operation contents acquiring unit
22 Data acquiring unit
23 Removal region selecting unit
24 Removal processing unit
25 Image recognition processing unit
26 Complementary region specifying unit
27 Frequency analysis unit
28 Complementary image generating unit
29 Image superimposition processing unit

The invention claimed is:

1. An image processing device comprising:
one or more processors configured to:
select, from an image acquired by imaging of a subject, a first region that includes a first object to be removed as a removal region based on distance information,
wherein the distance information is acquired in imaging of the image and indicates a distance to the subject;
specify a complementary region, which is to complement the removal region, from a second region in the image in which a background of the first object to be removed is included,
wherein the complementary region is specified based on the distance information;
perform image treatment processing of a complementary image generated from the complementary region, based on a frequency analysis of a peripheral object region that is in a periphery of the removal region; and
superimpose the processed complementary image on a place from which the removal region is deleted in the image.

2. The image processing device according to claim 1, wherein the one or more processors are further configured to clip the specified complementary region from the image to generate the complementary image.

3. The image processing device according to claim 1, wherein the one or more processors are further configured to perform the frequency analysis with respect to the peripheral object region that includes a second object at a same distance as the first object to be removed, and
wherein the image treatment processing includes addition of a blur or a noise to the generated complementary image based on a result of the frequency analysis.

4. The image processing device according to claim 1, wherein the one or more processors are further configured to recognize the subject included in the image, and a composition of the subject, and
the complementary region is further specified based on a result of the recognition.

5. The image processing device according to claim 4, wherein in a case where the image includes a first person on a front side of a second person, and the first person is larger in size than the second person, the result of the recognition indicates that the first person is the subject based on the distance information, and
the second region from which the complementary region is specified excludes the first person based on the result of the recognition.

6. The image processing device according to claim 1, wherein the one or more processors are further configured to recognize a second object that is on a back side of the first object to be removed, and
the second region from which the complementary region is specified includes the second object based on a result of the recognition.

7. The image processing device according to claim 1, wherein the one or more processors are further configured to recognize that the first object to be removed is in a position away from the subject for at least a predetermined distance, and
the second region from which the complementary region is specified includes the background that is at a greater distance than the first object from the subject based on a result of the recognition.

8. The image processing device according to claim 1,
wherein the one or more processors are further configured to recognize that a shake in a horizontal direction is generated in the periphery of the first object to be removed, and the complementary region is further specified from the second region where the shake in the horizontal direction is generated, based on a result of the recognition.

9. The image processing device according to claim 1,
wherein the one or more processors are further configured to recognize a first color surrounding the periphery of the first object to be removed, and the complementary region excludes a third region of the image that has a second color different from the first color.

10. An image processing method comprising steps of:
selecting, from an image acquired by imaging of a subject, a first region that includes an object to be removed as a removal region based on distance information;
wherein the distance information is acquired in imaging of the image and indicates a distance to the subject;
specifying, based on the distance information, a complementary region, from a second region in the image in which a background of the object to be removed is included, to complement the removal region;
performing image treatment processing of a complementary image generated from the complementary region, based on a frequency analysis of a peripheral object region that is in a periphery of the removal region; and
superimposing the processed complementary image on a place from which the removal region is deleted in the image.

11. A non-transitory computer-readable medium, having stored thereon, computer-executable instructions that, when executed by a computer, cause the computer to execute operations, the operations comprising:

selecting, from an image acquired by imaging of a subject, a first region that includes an object to be removed as a removal region with reference to distance information,
wherein the distance information is acquired in imaging of the image and indicates a distance to the subject;
specifying, based on the distance information, a complementary region, from a second region in the image in which a background of the object to be removed is included, to complement the removal region;
performing image treatment processing of a complementary image generated from the complementary region, based on a frequency analysis of a peripheral object region that is in a periphery of the removal region; and
superimposing the processed complementary image on a place from which the removal region is deleted in the image.

12. An imaging device comprising:
one or more processors configured to:
a subject;
acquire distance information that indicates a distance to the subject when the image is imaged;
select, from the image, a first region that includes an object to be removed as a removal region based on the distance information;
a complementary region to complement the removal region from a second region in the image in which a background of the object to be removed is included,
wherein the complementary region is specified based on the distance information;
perform image treatment processing of a complementary image generated from the complementary region, based on a frequency analysis of a peripheral object region that is in a periphery of the removal region; and
superimpose the processed complementary image on a place from which the removal region is deleted in the image.

* * * * *